US007162210B2

United States Patent
Garmonov et al.

(10) Patent No.: US 7,162,210 B2
(45) Date of Patent: Jan. 9, 2007

(54) METHOD AND DEVICE OF ANTENNA PATTERN FORMING

(75) Inventors: Alexandr V. Garmonov, Voronezh (RU); Vladimir B. Manelis, Voronezh (RU); Andrew Yu. Savinkov, Voronezh (RU); Igor V. Kayukov, Voronezh (RU); Byung-Jin Chun, Suwon-shi (KR); Soon-Young Yoon, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 400 days.

(21) Appl. No.: 10/306,526

(22) Filed: Nov. 27, 2002

(65) Prior Publication Data

US 2003/0100344 A1   May 29, 2003

(30) Foreign Application Priority Data

Nov. 27, 2001   (RU) .............................. 2001131937

(51) Int. Cl.
*H04B 1/02* (2006.01)
(52) U.S. Cl. ................... 455/101; 455/562.1; 455/137; 455/276.1; 375/267; 375/347
(58) Field of Classification Search ............... 455/63.1, 455/67.1, 69, 70, 101, 562, 423–425, 504–506, 455/134, 135, 137, 276.1, 226.3; 342/372, 342/378; 375/267, 347, 147, 148, 144
See application file for complete search history.

(56) References Cited

U.S. PATENT DOCUMENTS

| 6,067,324 A * | 5/2000 | Harrison ..................... 375/267 |
| 6,363,103 B1 * | 3/2002 | Buehrer et al. ............. 375/148 |
| 6,587,451 B1 * | 7/2003 | Kwon et al. ................. 370/339 |
| 6,600,933 B1 * | 7/2003 | Hiramatsu et al. .......... 455/561 |
| 6,826,386 B1 * | 11/2004 | Doi .............................. 455/25 |
| 6,853,839 B1 * | 2/2005 | Usuda et al. ............. 455/276.1 |
| 2002/0184166 A1 * | 12/2002 | Jackson et al. ............... 706/14 |
| 2004/0264558 A1 * | 12/2004 | Chae et al. ................. 375/148 |

* cited by examiner

*Primary Examiner*—Eliseo Ramos-Feliciano
*Assistant Examiner*—Anthony S. Addy
(74) *Attorney, Agent, or Firm*—Dilworth & Barrese LLP (57) ABSTRACT

Improvement of interference canceling efficiency and communication system capacity due to the use of the optimal decision function in adaptation of the adaptive antenna array weight factors. An adaptive antenna array pattern forming algorithm is used. The weight vector is determined from the position of the decision function maximum. The proposed decision function is based on estimation of signal to interference plus noise ratio (SINR) at the adaptive antenna array output and is no singular even without noise and interference.

5 Claims, 8 Drawing Sheets

METHOD AND DEVICE OF ANTENNA PATTERN FORMING

PRIORITY

This application claims priority to an application entitled "Method and Device of Antenna Pattern Forming" filed in the Russian Industrial Property Office on Nov. 27, 2001 and assigned Serial No. 2001131937, the contents of which are hereby incorporated by reference.

BACKGROUND OF THE INVENTION

1. Field of the Invention

The proposed invention relates to radio engineering, particularly, to the methods of multipath signal reception using an adaptive antenna array in CDMA communication systems and can be applied to receivers of cellular communications systems.

2. Description of the Related Art

During the last decade, CDMA systems have been intensively deployed worldwide. The necessity of increasing the capacity of these systems forced the use of adaptive antenna arrays at base stations, which is reflected in 3G communications standards.

An adaptive antenna array carries out a weighed combining of the signals from antenna array elements and enables space processing of signals. The processing parameters (weight factors of antenna array elements determining an antenna pattern) are automatically varying so that to provide the best (or acceptable) desired signal reception conditions in a variable environment that interferes with the signal. The use of an adaptive antenna array in CDMA cellular communications systems enables considerable improvement of a number of system parameters, particularly, system capacity, communication quality, coverage area, and mobile user power consumption.

During generation of the weight factor vector of antenna array elements, according to the selected optimality criterion, it is possible to obtain space filtration effects, mitigate powerful interference and perform angle spreading in a multipath channel.

A device of adaptive antenna array beam control operating according to the algorithm of direct inversion of the co-variance matrix of the input signal is disclosed in Russian patent application #98102722/09. The device implements the method of adaptive antenna array beam control according to the criterion of the minimum mean-squared deviation of the output signal of an antenna array from the reference signal. In this application, in order to find the vector of weight factors, the co-variance matrix of the input signal is generated and inversed at the antenna array elements.

The disadvantage of this algorithm is relatively high implementation complexity, and considerable reduction of the accuracy of determination of the weight vector in case the co-variance matrix is badly conditioned.

A method of adaptive antenna array beamforming is described in EP patent EP 0 899 894 A2. "Smart Antenna Receiver and Signal Receiving Method," by Park Jin-Soo. The described adaptive algorithm forms a beam according to the criterion of minimum instant squared deviation of the output antenna array signal from the reference signal. The weight vector is determined numerically by the method of fastest descent.

In order to obtain the weight vector close to the optimum, a great number of iterations is needed. The algorithm is disadvantageous when reception conditions are varying rapidly.

A method of adaptive antenna array beamforming is disclosed in U.S. Pat. No. 6,108,565 to Shimon B. Scherzer, "Practical Space-Time Radio Method for CDMA Communication Capacity Enhancement", issued Aug. 22, 2000. The described method, is as follows.

The weight factors of path elements are formed, for which the following operations are carried out over each path:

the input signal is demodulated at antenna array elements, the demodulated input signal is fast Hadamar transformed at antenna array elements forming the input signal matrix, the input signal matrix is multiplied by the reference signal matrix, an estimate of the angle of arrival of the input path signal is found by analyzing the result of multiplication of the input signal matrix and the reference signal matrix, the current weight vector is defined as the vector corresponding to the estimate of angle of arrival of the input path signal.

The current values of the weight factors of paths are used for the output ones and determine an adaptive antenna array beam.

The reference signal matrix is determined by the signals corresponding to the pre-determined discrete hypotheses of angle of arrival of the input signal. The estimate of angle of arrival of the input signal $\theta$ determines the weight vector according to the equation $$w = [1, e^{-j\phi}, e^{-j2\phi}, \ldots, e^{-j(N-1)\phi}], \quad (1)$$

where $$\phi = \frac{2\pi}{\lambda} d\sin\theta,$$

$\lambda$—wavelength, d—spacing/distance between antenna array elements and N is the number of processing channels in a path signal processing unit.

Figure 1:
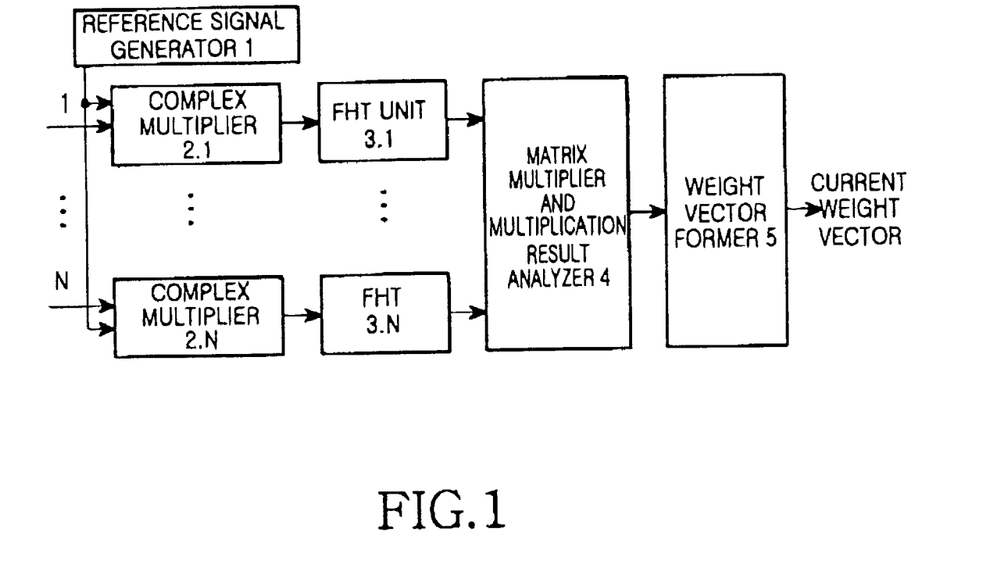
FIG. 1 is a block diagram of a known device.

FIG. 1 shows a device for implementing this method. The device comprises L path signal processing units, one shown in FIG. 1. Each of L path signal processing units includes N parallel channels composed of successively linked complex multipliers 2.1–2.N and FHT (Fast Hadamar transform) units 3.1–3.N, and further comprises reference signal generator 1, matrix multiplier and multiplication result analyzer 4, and weight vector former 5. The first inputs 1–N of complex multipliers 2.1–2.N are the signal inputs of the device; the second inputs are reference signals output by reference signal generator 1. The output of each FHT unit 3.1–3.N is linked to the corresponding input of matrix multiplier and multiplication result analyzer 4, the output of which is input to the input of weight factor former 5. The output of weight factor former 5 is the current vector of path weight factors and the output of the device.

The device operates in the following manner. In each of L signal processing units, the complex input signal is supplied to the first (signal) inputs 1–N of complex multipliers 2.1–2.N. A reference PN sequence is applied to the second (reference) inputs of complex multipliers 2.1–2.N from the output of reference signal generator 1. The state of reference signal generator 1 corresponds to the path signal time position in the received multipath signal. Complex demodulated signals are output from complex multipliers 2.1–2.N and input to corresponding FHT units 3.1–3.N, where the input signal is decomposed in the Hadamar function basis. Input signal spectrums are output from the FHT units 3-1–3-N and supplied to N inputs of matrix multiplication and multiplication result analyzer 4. In unit 4 the input signal matrix is multiplied by the reference signal matrix. The input signal matrix is formed from the input signal spectrums. The reference signal matrix is determined by the signals corresponding to the pre-determined discrete hypotheses on angle of arrival of the input signal. In addition, matrix multiplier and multiplication result analyzer 4 analyzes the result of multiplication of the input signal matrix by the reference signal matrix and the estimate of angle of arrival of the input path signal is acquired. The estimate of angle of arrival of the input path signal is output by matrix multiplier and multiplication result analyzer 4 and input to the weight vector former 5. Weight vector former 5 based on the estimate of angle of arrival of the input path signal forms at its output the current vector of weight factors of the path that is the output signal of the device.

One disadvantage of this system is the impossibility of canceling interferences caused by signals whose angle of arrival differs inconsiderably from the desired signal arrival angle.

SUMMARY OF THE INVENTION

The problem solved by the proposed solution is improving of interference canceling efficiency and system capacity due to the use of the optimal decision function during adaptation of adaptive antenna array weight factors.

In order to solve this problem, the method of antenna array beamforming during multipath signal reception, in which a vector of weight factors is formed for each path, for which periodically the input signal is demodulated at antenna array elements, the value of the current weight factor vector, which is connected with an adaptive antenna array beam, is determined by the steps of;

prior to demodulation of the input signal a search for a signal is carried out finding the time positions of paths' signals, the correlation matrix elements of the received signal are generated at antenna array elements by averaging all the possible pairwise products of signals received at antenna array elements within a sliding window interval, the correlation matrix of the received signal is corrected at antenna array elements by increasing the values of its diagonal elements, which is equivalent to introduction of artificial white noise at the antenna array input, the vectors of weight factors, for which the decision function values should be determined, are defined for each path, after demodulation of the input signal, complex correlation responses of the pilot signal of antenna array elements are generated, the value of a complex correlation response of the pilot signal is formed for each weight vector at the antenna array output by combining the products of complex correlation responses of the pilot signal of antenna array elements and the weight factors corresponding to these elements, the power of the complex correlation response of the pilot signal at the antenna array output is determined summing the squared inphase and quadrature components of the complex correlation response of the pilot signal at the antenna array output, the power of the received signal and artificial white noise at the antenna array output is determined by forming the quadrature shape of the weight vector produced by the corrected correlation matrix of the received signal at antenna array elements, the decision function value is generated determining the power ratio of the complex correlation response of the pilot signal at the antenna array output to the power the received signal and artificial noise at the antenna array output, the current weight vector value is defined as a vector corresponding to the maximum value of the decision function.

The weight vectors for which the decision function is calculated can be determined according to the simplex Nelder-Mead method.

The simplex size may be selected to be constant or adaptive depending on the fading frequency of the path signal; the path signal fading frequency may be estimated using complex correlation responses of the pilot signal at the antenna array output; the higher fading frequency is the more simplex size is.

A device of antenna array beam/pattern forming, during multipath signal reception according to the invention comprises L path signal processing units, each comprised of a reference signal generator, N complex multipliers and a weight vector former, the signal inputs of the N complex multipliers being the first signal input of the path signal processing unit, the reference inputs of the N complex multipliers being linked to the output of the reference signal generator, the output of the weight vector former being the output of the current vector of weight factors of a path and corresponding to the output of the device, the device further comprising a searcher, a controller, a correlation matrix generator and a correlation matrix corrector; each of the L signal processing units further comprising N units of pilot signal correlation response generators, each comprised of successively linked combiner with reset feature, tapped delay line and, combiner, wherein the output of each complex multiplier comprising the demodulated signal, is connected to the first input of the corresponding combiner with reset feature, comprising the first input of correlation response generator, the second input of the combiner with reset feature is the second input of correlation response generator and also the input of the reset feature and is connected to the control output of the controller providing synchronous operation of the path signal processing units, the output of the combiner is the output of the pilot signal correlation response generator and is input as the complex correlation response of the pilot signal to the weight vector former, wherein N signal inputs of L signal processing units are combined and linked to N signal inputs of the correlation matrix generator the output of which is the output of the received signal correlation matrix elements at the antenna array elements and is joined with the input of the correlation matrix correction unit, the output of which is input as the corrected correlation matrix elements of the received signal to the weight vector former; and wherein the first signal input of the device is linked to the input of the searcher whose output is the result of a search decision function and coupled on to the controller input, the controllable input of the searcher being linked to the corresponding output of the controller.

Comparative analysis of the adaptive antenna array pattern forming method and the prototype in multipath reception environment shows that the proposed invention significantly differs from the prior art by improving interference canceling capabilities and accuracy of characteristics during signal receiving in various interference-signal conditions owing to the use of the optimal decision function in adaptation of the adaptive antenna array weight factors.

The invention significantly improves interference canceling capabilities and accuracy of characteristics during signal receiving in various interference-canceling conditions owing to the use of the optimal decision function in adaptation of the adaptive antenna array weight factors.

BRIEF DESCRIPTION OF THE DRAWINGS

The features, objects, and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

The present method of antenna array pattern forming in multipath signal reception environment is generally described as follows.

A signal is searched for, finding time positions of path signals.

The weight factors of paths are adaptively calculated. For this, the following operations are periodically (at each adaptation step) carried out:

The received signal correlation matrix elements are generated at the antenna array elements by averaging all the possible pairwise products of signals at the antenna array elements within the sliding window interval;

The correlation matrix of the received signal is corrected at the antenna array elements by incrementing the leading diagonal elements, which is equivalent to introduction of the artificial white noise at the antenna array input.

For each path:
the weight vectors for which decision function values should be determined are found;
the input signal is demodulated at the antenna array elements;
the pilot signal complex correlation responses of antenna array elements are formed;
for each found vector of weight factors:
a value of the pilot signal complex correlation response is generated at the antenna array output by combining the products of the pilot signal complex correlation responses of the antenna array elements and the weight factors corresponding to these elements;

a power of the pilot signal complex correlation response is determined at the antenna array output by summing up the squared inphase and quadrature parts of the pilot signal complex correlation response at the antenna array output;
a power of the received signal and artificial noise is found at the antenna array output by forming the quadrature shape of the weight vector produced by the corrected correlation matrix of the received signal at the antenna array elements;
a value of the decision function is generated by determining the power ratio of the complex correlation response of the pilot signal at the antenna array output to the received signal and artificial noise power at the antenna array output.

The current weight vector is defined as a vector corresponding to the maximum decision function value.

Current vectors of weight factors of the paths are output and determine an adaptive antenna array pattern.

The invention comprises an adaptive algorithm of antenna array pattern forming. The weight vector is determined from the position of the decision function maximum (cost function). It is known that without interference and noises an estimate of the signal to noise plus interference ratio (SINR) becomes singular and is no longer able to provide weight factor adaptation. The inventive decision function comprises estimation of pilot channel SINR at the adaptive antenna array output but is not singular even without noises and interference.

An embodiment of the decision function of the present invention comprises the following:

$$Z(w) = \frac{|\tilde{X}|^2}{Y}, \quad (2)$$

where $$\tilde{X} = \sum_{n=1}^{N} w_n u_n \quad (3)$$

is the pilot signal complex correlation response at the antenna array output, $w = \{w_1, \ldots, w_N\}$ is the weight vector, $u_n$, $n=\overline{1,N}$ <-1, 2, ..., N is the pilot signal complex correlation responses, N is a number of the antenna array elements, $$Y = \sum_{n=1}^{N} \sum_{m=1}^{N} w_n w_m^* \tilde{K}_{nm}. \quad (4)$$

$$\tilde{K}_{nm} = K_{nm} + \alpha \delta_{nm} \quad (5)$$

$$K_{nm} = \sum_{j=1}^{J} x_n(t_j) x_m^*(t_j) \quad (6)$$

is the signal correlation matrix at the antenna array elements, $x_n(t_j)$, $j=1, 2, \ldots$, $n=\overline{1,N}$ <-1, 2, ..., N are the input signal samples at the antenna array elements, and $\delta_{nm}$ is the Kronecker symbol, $$\alpha = \frac{1}{100N} \sum_{n=1}^{N} K_{nn}.$$

Figure 2:
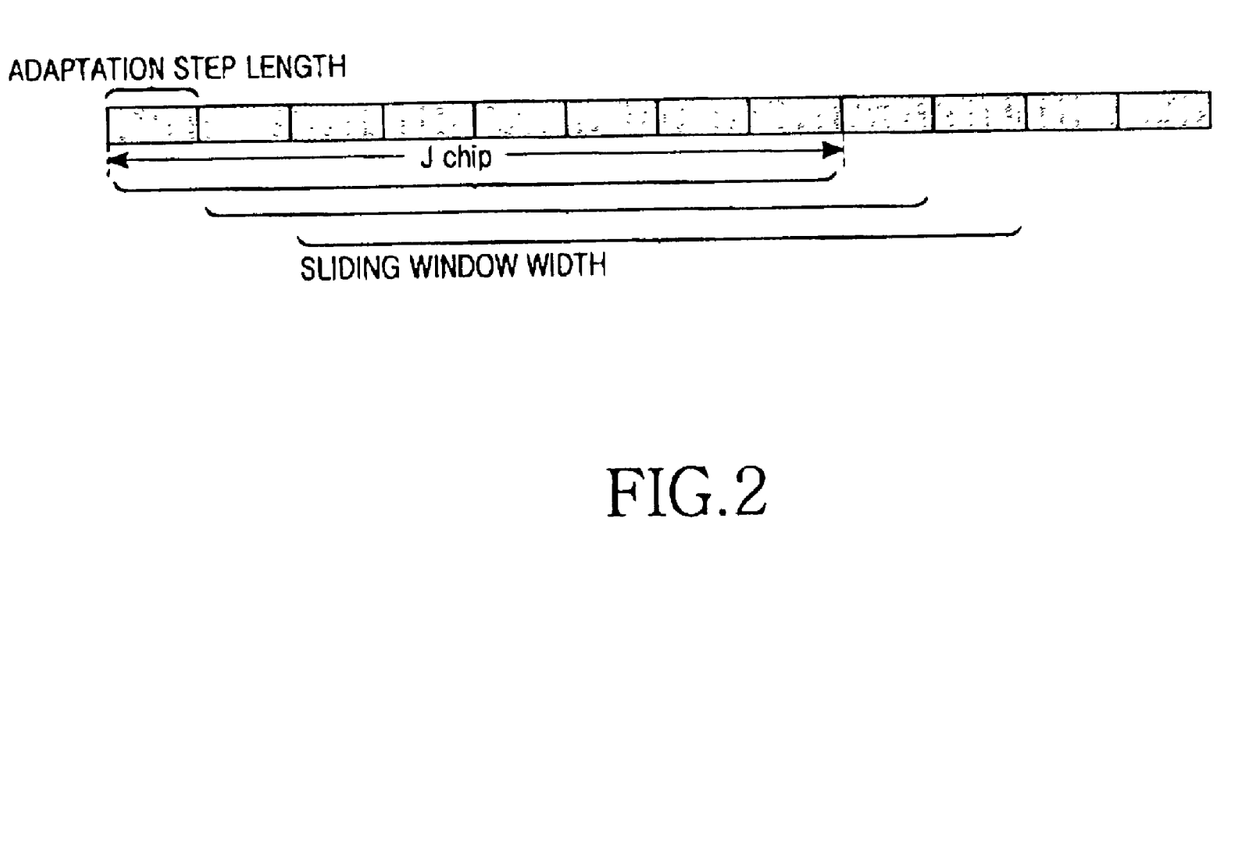
FIG. 2 illustrates sliding window width and position.

The complex correlation responses of the pilot signal $u_n$ and the correlation matrix elements $K_{nm}$, $n,m=\overline{1,N}<-1, 2, \ldots$, N are generated using the sliding window from J samples (chips) of the input signal as shown for example, in FIG. 2.

The difference between the matrix $\tilde{K}$ being used from the signal correlation matrix at the antenna array elements K is in slightly incremented values of the leading diagonal elements. This removes singularity of the decision function (2) without noises and interference and provides efficient adaptation of weight factors.

The second summand in (5) is adequate to introduction of the artificial white noise at the antenna array input (AWGN), AWGN being independent at the elements. The quadrature shape (4) of the weight vector W produced by the corrected correlation matrix $\tilde{K}$ of the received signal at the antenna array elements is the power of the received signal and artificial AWGN at the adaptive antenna array output.

Since the weight vector is invariant to multiplication by a complex constant, one of the weight factors is fixed, for example, $w_1=1$.

The weight vectors for which the decision function is calculated may, for example, be calculated according to the simplex Nelder-Mead method.

Since one weight complex factor, namely, $w_1$, is fixed, (N−1) complex weight factors or $k=2(N-1)$ real factors are to be adapted.

In order to determine a number of the weight vectors and their values, for which the decision function is calculated, it is preferable to use the notion of a simplex. In the proposed adaptive procedure, a simplex is a regular polyhedron in the k-dimension space of the factors being adapted. The weight vectors for which the decision function is calculated are determined by the coordinates of the simplex vertices. The number of simplex vertices or the number of weight vectors for which the decision function is calculated is (k+1). If the number of antenna array elements is N=4, for example, it follows that the number of vectors analyzed at every adaptation step is 7. The coordinates of the vectors being analyzed (simplex vertices) are the matrix columns:

$$V = \begin{bmatrix} v_1 & v_1+d_1 & v_1+d_2 & \ldots & v_1+d_2 \\ v_2 & v_2+d_2 & v_2+d_1 & \ldots & v_2+d_2 \\ v_3 & v_3+d_2 & v_3+d_2 & \ldots & v_3+d_2 \\ . & . & . & . & . \\ v_k & v_k+d_2 & v_k+d_2 & \ldots & v_k+d_1 \end{bmatrix} \} k, \quad (7)$$

$$\underbrace{\qquad\qquad\qquad\qquad\qquad}_{k+1}$$

where $$d_1 = \frac{a}{k\sqrt{2}}(\sqrt{k+1}+k-1), d_2 = \frac{a}{k\sqrt{2}}(\sqrt{k+1}-1), \text{ and}$$

a is the distance between any two simplex vertices (simplex size). The simplex size value a affects the rate of antenna array pattern forming and the speed of adaptation process and also determines stability of the adaptation process in noises. The higher a is the higher the adaptation rate is and the lower stability is.

At the first adaptation step, the values of the parameters $v_1, v_2, \ldots v_k$ (simplex position) can be arbitrary, for example, $v_1=v_2=\ldots=v_k=0$. At the further adaptation steps, the values of the weight factor vectors are determined in the following manner.

At the preceding adaptation step, as a result of calculation of the decision function for the weight vectors corresponding to the simplex vertices, the j-th vertex is determined (the weight vector $w_j$) for which the decision function $Z(w)$ is maximum. The simplex vertices of the next adaptation step are all the vertices of the preceding step except the j-th one and also the vertex of the coordinates:

$$w^* = \frac{2}{k}\left(\sum_{\substack{n=1 \\ n \neq j}}^{k+1} w_n\right) - w_j \quad (8)$$

where $w_n$, $n=\overline{1,N}<-1, 2, \ldots$, N are the weight vectors (coordinates of simplex vertices) of the preceding adaptation step.

At each adaptation step, the weight vector corresponding to the maximum cost function value is determined. This vector is set at the information signal reception and forms an adaptive antenna array pattern in the reverse channel.

The simplex size determining the rate of change of current weight vector can be selected adaptively depending on the fading frequency of path signals. The higher the fading frequency is, the greater the simplex size. In that case the fading frequency of path signal is estimated using the complex correlation responses of the pilot signal at the antenna array output.

At the first adaptation step, the simplex position (the weight vector values) can bevaried. Subsequently, the simplex position (weight vector values) are determined in the following manner.

Each simplex position can be varied using $a_1$ and $a_2$ having a respectively different simplex size. At the preceding adaptation step, along with the simplex size $a_1$, in calculating the decision function for the weight vectors corresponding to the simplex vertices, the j-th and m-th vertices (the weight vector $w_j$) are determined. For the former, the decision function $Z(w)$ value is minimum and for the latter the decision function $Z(w)$ value is maximum. The simplex vertices of the current adaptation step with the simplex size $a_2$ are the $m^{th}$ vertex of the preceding step of the coordinates $w_m$ and when the simplex size is $a_1$, the vertices of new coordinates, $w_m$ and $w^*$ are as below, respectively:

$$(w_n - w_m)\frac{a_2}{a_1} + w_m, n = \overline{1, k+1}, n \neq j, n \neq m$$

and the vertex of the coordinates:

$$(w^* - w_m)\frac{a_2}{a_1} + w_m,$$

where $w^*$ is determined by (8).

Figure 3:
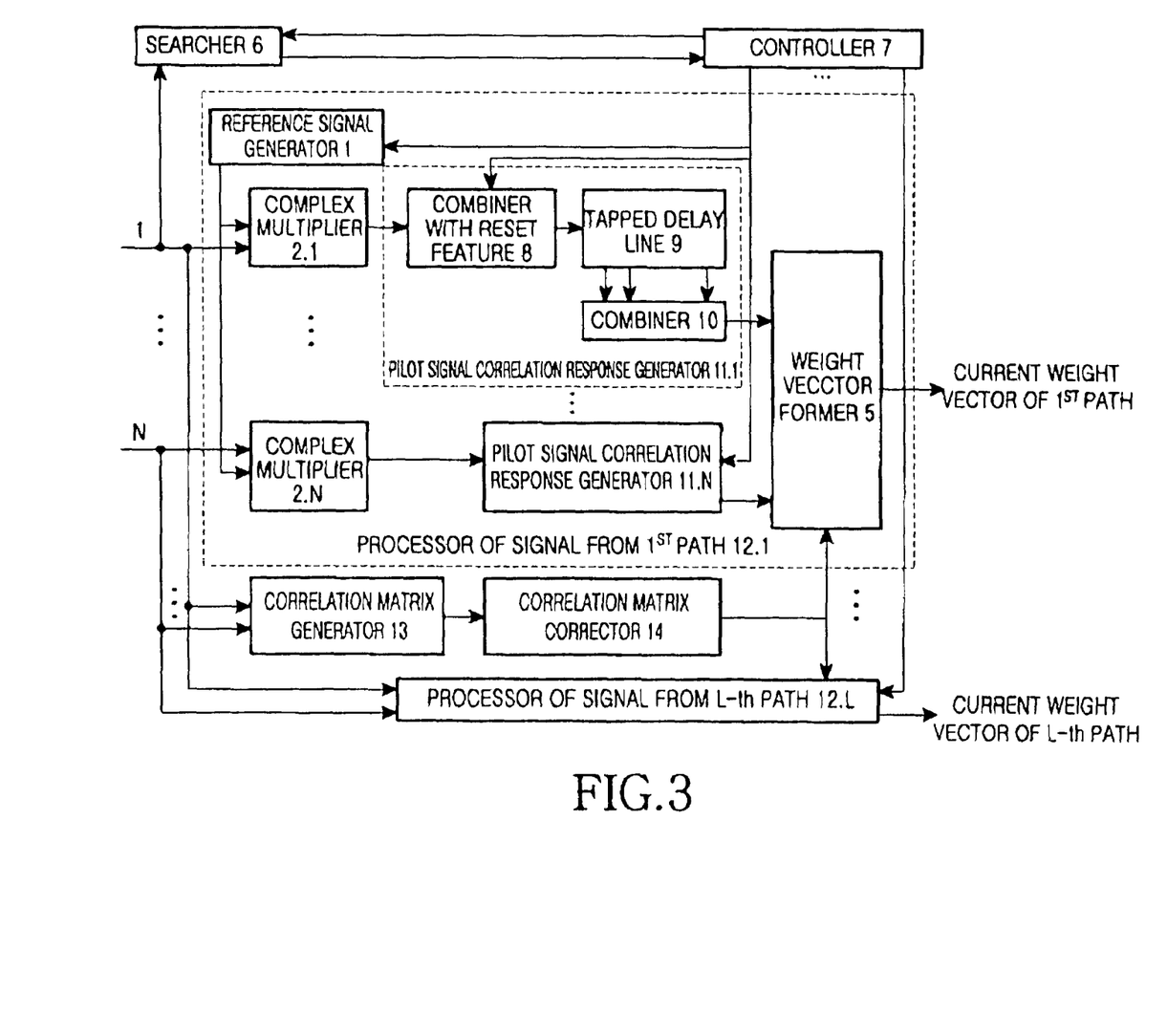
FIG. 3 is a block diagram of the device of adaptive antenna array pattern forming in multipath reception conditions according to the present invention.

An embodiment of the present invention is shown in the block diagram of FIG. 3. FIG. 3 comprises L processors of signals from L paths 12.1–12.L, searcher 6, controller 7, correlation matrix generator 13 and correlation matrix corrector 14. As represented by processing unit 12.1, every processing unit 12.1–12.L comprises N branches comprising successively linked complex multiplier 2.1–2.N and pilot signal correlation response generator 11.1–11.N, reference signal generator 1 and weight vector former 5. As represented by generator 11.1, every pilot signal correlation response generator 11.1–11.N comprises successively linked combiner with reset feature 8, tapped delay line 9 and combiner 10. The first (signal) input of complex multipliers 2.1–2.N is one of N signal inputs of the proposed device. "The second input of complex multiplier 2.1–2.N is a reference signal output by reference signal generator 1. The input of reference signal generator 1 is a control signal output by controller 7, providing synchronous operation of the device units. The first input of combiner with reset feature 8 is from the output of corresponding complex multiplier 2.1–2.N. The second input of combiner with reset feature 8 is from the output of controller 7. The output of combiner 10 is the output of the complex correlation responses of the pilot signal of antenna array elements and also provides the output of pilot signal correlation response generator 11.1–11.N. The output of N pilot signal correlation response generators 11.1–11.N are input to weight vector former 5. The output of weight vector former 5 is the output of the current vector of path weight factors of the corresponding unit processing a signal from this path 12.1–12.L.

N inputs of each of L path signal processing units 12.1–12.L are combined with each other and the corresponding inputs of correlation matrix generator 13 whose output is connected to the input of correlation matrix corrector 14. The outputs of correlation matrix corrector 14 are linked to the corresponding inputs of units 5 that form weight factors of all the L units of weigh vector former path signal processing 12.1–12.L.

Additionally, the first signal input is connected to the input of searcher 6, whose output is search decision function and linked to the input of controller 7. The control input of searcher 6 is likewise with the output of controller 7. Complex signals of N antenna array elements are supplied to the inputs of path signal processing units 12.1–12.L, namely, to the first inputs of complex multipliers 2.1–2.N and to N inputs of correlation matrix generator 13. The complex signal from the first antenna array element is applied to the input of searcher 6. Searcher 6 forms the decision function at discrete time positions. This data from searcher 6 is sent to controller 7, which compares the decision function values obtained to the threshold and determines path signal time positions. Based on the found values of path signal time positions, controller 7 synchronizes operation of path signal processing units 12.1–12.L.

To the second inputs of complex multipliers 2 the reference PN sequence is supplied from the output of reference signal generator 1. The states of reference signal generator 1 are controlled by controller 7 according to the path signal time positions in the received multipath signal. The demodulated signal from the output of each complex multiplier 2 is applied to the first input of combiner with reset feature 8, to the second input of which the control reset signal is sent from controller 7. Combiner with reset feature 8 executes the operation of symbolwise accumulation of the inphase and quadrature signal components. The output of combiner with reset feature 8 is a complex correlation response of pilot symbols is supplied to combiner 10 via tapped delay line 9. Tapped delay line 9 and combiner 10 carry out sliding averaging of complex correlation responses of pilot symbols forming complex correlation responses of the pilot signal of antenna array elements. The pilot signal complex correlation responses of antenna array elements from the outputs of all pilot signal correlation response generators 11.1–11.N, namely, from the outputs of the respective combiners 10, are sent to the inputs of weight vector former 5.

Correlation matrix generator 13 averages pairwise products of signals at antenna array elements within the sliding window interval, thus forming the values of the received signal correlation matrix elements at antenna array elements, which are applied to the input of correlation matrix corrector 14. Correlation matrix corrector 14 corrects the correlation matrix of the received signal at antenna array elements incrementing the leading diagonal elements, which is equivalent to introduction of artificial AWGN at the antenna array input. From the outputs of correlation matrix corrector 14 the elements of the corrected correlation matrix of the received signal at the antenna array elements are supplied to the inputs of weight factor former 5 of all signal processing units 12.1–12.L. Weight factor former 5 generates the current weight factor vector, which is the output signal of the device.

Figure 4:
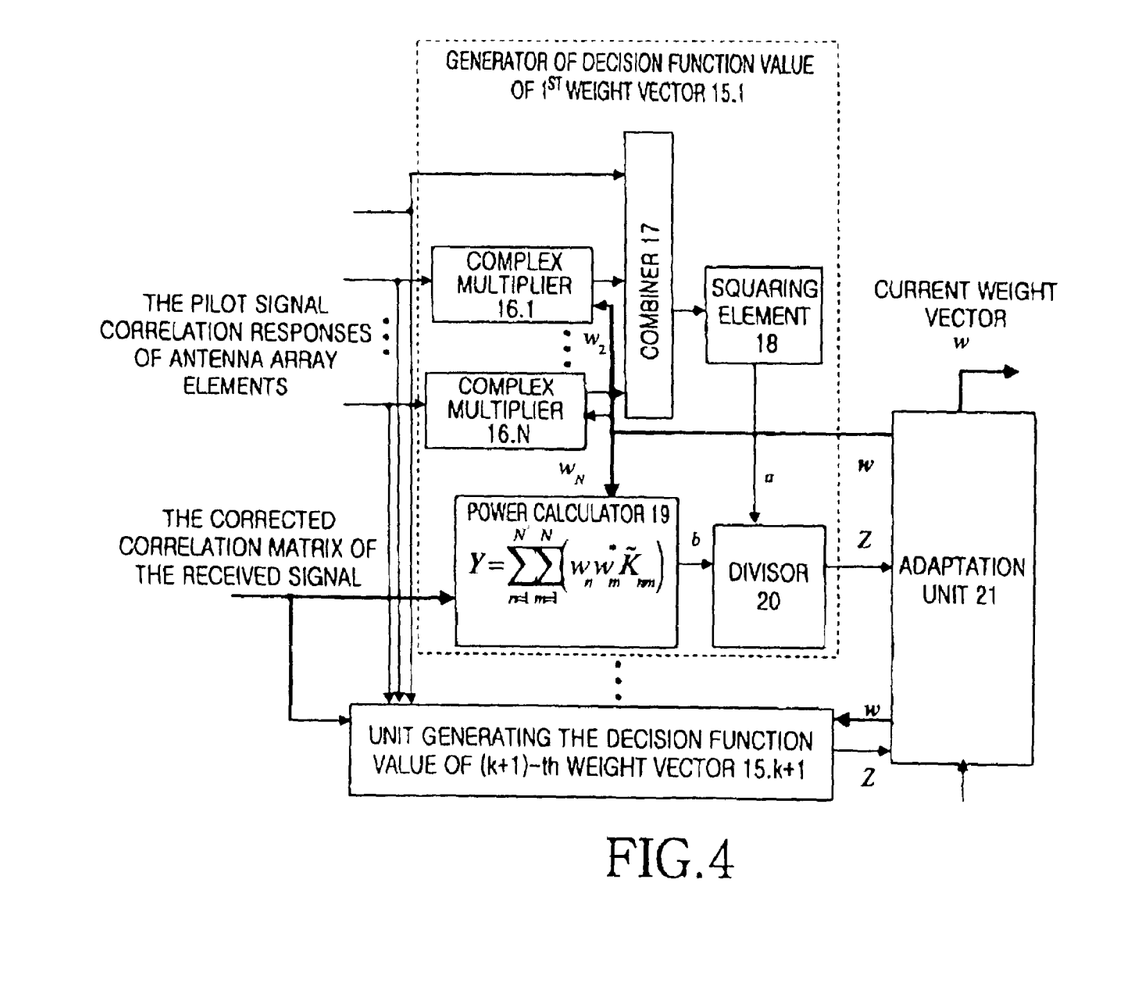
FIG. 4 is an exemplary embodiment of a weight vector former according to the present invention.

FIG. 4 is an exemplary embodiment of weight vector former 5 of FIG. 3. Weight factor calculator 5 includes adaptation unit 21 and (k+1) units generating decision function values 15.1–15.(k+1), which determine decision function values for weight vectors of the current adaptation step.

The pilot signal correlation responses of antenna array elements from the outputs of pilot signal correlation response generators 11.1–11.N are delivered to the inputs of decision function generators 15.1–15.(k+1), namely, to the inputs of complex multipliers 16.1–16.(N−1) (except for the correlation response of the pilot signal of $1^{st}$ antenna array element). To the second inputs of complex multipliers 16.1–16.(N−1) weight factors are supplied from the output of adaptation unit 21. The outputs of the complex multipliers 16.1–16.(N−1) multiplication are sent to N−1 inputs of combiner 17. The pilot signal correlation response of $1^{st}$ antenna array element is supplied to the first input of combiner 17. Combiners 17 of decision function value generating units 15.1–15.(k+1) generate the values of the pilot signal complex correlation responses at the antenna array output for every weight vector formed in adaptation unit 21. From the output of combiner 17 the value of the pilot signal complex correlation response at the antenna array output is supplied to the input of squaring element 18. Squaring element 18 determines the power of the pilot signal complex correlation response at the antenna array output, by summing the squared inphase and quadrature components of the pilot signal complex correlation response at the antenna array output. The power of the pilot signal complex correlation response from the output of squaring element 18 is sent to the first input of divisor 20.

The elements of the corrected matrix of the received signal from the output of correlation matrix corrector 14 are supplied to the input of decision function value generating units 15.1–15.(k+1), namely, to the inputs of power calculators 19. The values of the weight vector are sent from the output of adaptation unit 21 to the other inputs of power calculators 19. Power calculator 19 determines the power of the received signal and artificial AWGN at the antenna array output, forming the quadrature shape of the weight vector produced by the corrected correlation matrix of the signal received at the antenna array elements. The power of the received signal and artificial AWGN at the antenna array are output from the output of power calculator 19 to the second input of divisor 20. Divisor 20 generates the decision function value by finding the power ratio of the pilot signal complex correlation response at the antenna array output to the power of the received signal and artificial AWGN at the antenna array output. From the outputs of divisors 20 of all decision function value generating units 15.1–15.(k+1) decision function values are sent to (k+1) inputs of adaptation unit 21.

Adaptation unit 21 determines the current weight vector corresponding to the maximum decision function value, which is delivered to the output of adaptation unit 21. The output of adaptation unit 21 is the output of weight factor generating unit 5. In addition, adaptation unit 21 determines (k+1) weight vectors according to the simplex Nelder-Mead method, the decision function to be determined for the weight factors at the next adaptation step. These weight vectors are supplied to the corresponding inputs of decision function value generating units 15.1–15.(k+1).

Figure 5:
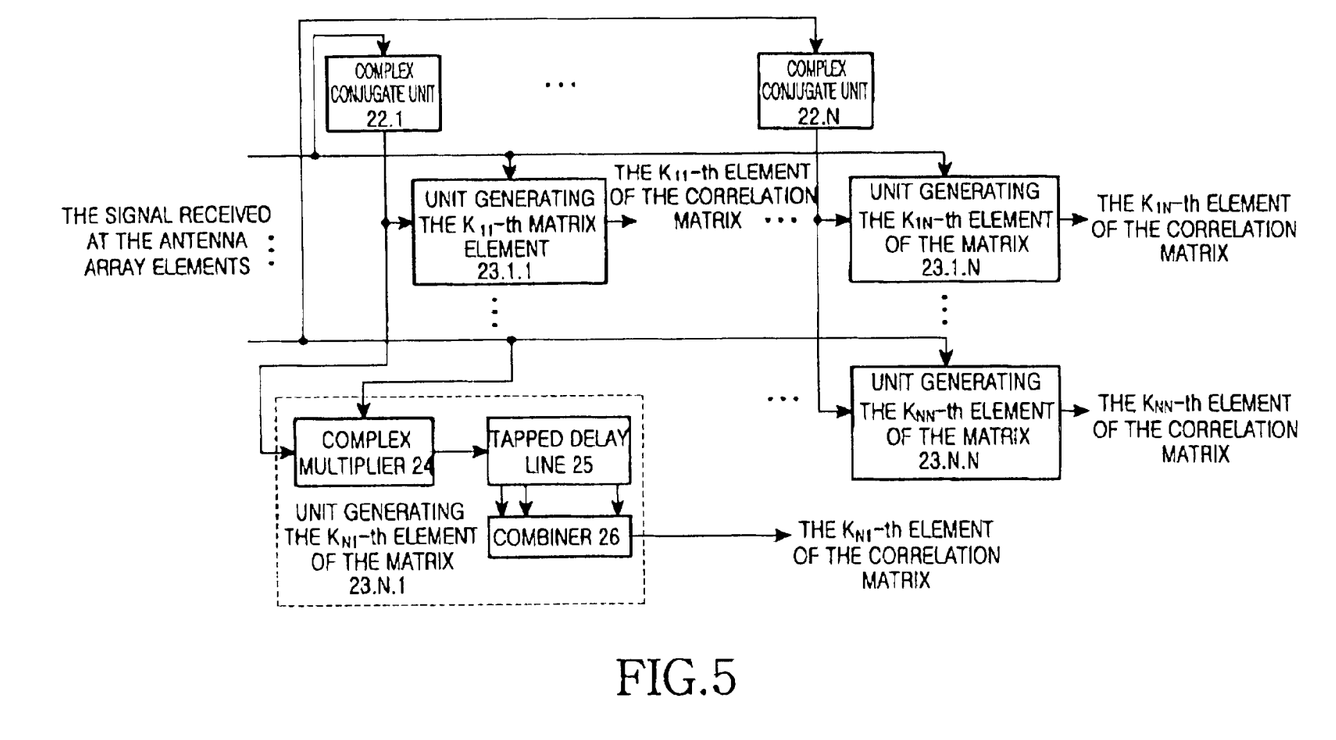
FIG. 5 is an exemplary embodiment of a correlation matrix generator according to the present invention.

FIG. 5 is an exemplary embodiment of correlation matrix generator 13 of FIG. 3. The input signal received at the antenna array elements are supplied to the inputs of N complex conjugate units 22 and to the first inputs of matrix element generating units 23. Thus, the input signal received at the first antenna array element is sent to the first inputs of matrix element generating units 23.1.1–23.1.N, ... the input signal received at the n-th antenna array element is sent to the first inputs of matrix element generating units 23.n.1–23.n.N, etc. From the outputs of the N complex conjugate units 22 the adjoint input received signals at the antenna array elements are applied to the second inputs of matrix element generating units 23. Thus, for example, the adjoint input received signal at the m-th antenna array element is supplied to the first inputs of matrix element generating units 23.1.m–23.N.m.

As exemplified by unit 23.N.1 in FIG. 5, the first and second inputs of matrix element generating unit 23 are applied to the inputs of complex conjugate unit 24. From the output of complex conjugate unit 24 the product of signals at the antenna array elements is supplied to combiner 26 via tapped delay line 25. Tapped delay line 25 and combiner 26 perform sliding averaging of the product of signals at the antenna array elements, thus forming at its output the correlation matrix element of received signal at the antenna array elements.

Figure 6:
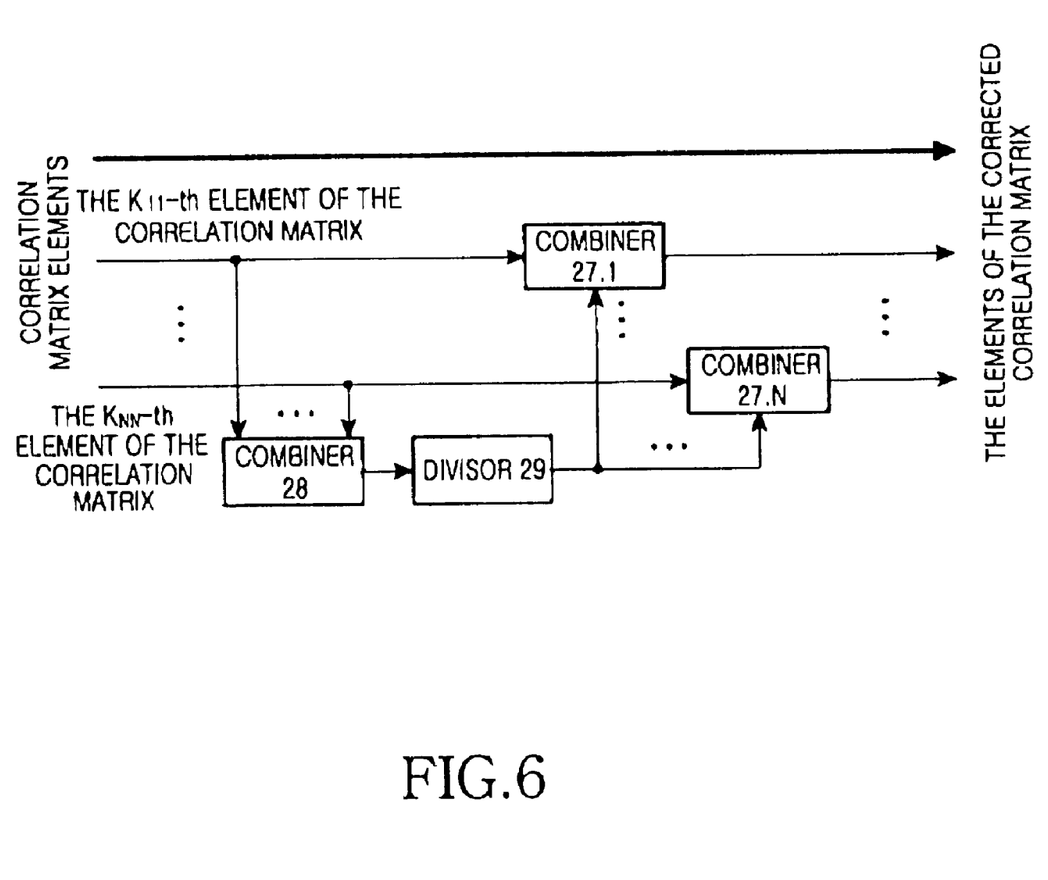
FIG. 6 is an exemplary embodiment of a correlation matrix correction unit according to the present invention.

FIG. 6 is an exemplary embodiment of correlation matrix corrector 14 of FIG. 3. Correlation matrix corrector 14 corrects the correlation matrix of the received signal at the antenna array elements incrementing the leading diagonal elements, which is equivalent to introduction of artificial AWGN at the antenna array input. The elements of the leading diagonal of the received signal correlation matrix from the output of correlation matrix generator 13 are supplied to the first inputs of combiners 27.1–27.N, respectively, and to the N inputs of combiner 28. The combined signal from the output of combiner 28 is supplied to the input of divisor 29, where it is divided by 100N. From the output of the divisor, the correlating value is applied to the second inputs of combiners 27.1–27.N. Combiners 27.1–27.N correct the elements of the leading diagonal of the correlation matrix by incrementing their values. The rest of the elements of the correlation matrix are supplied to the output of correlation matrix corrector 14 unchanged.

Figure 7:
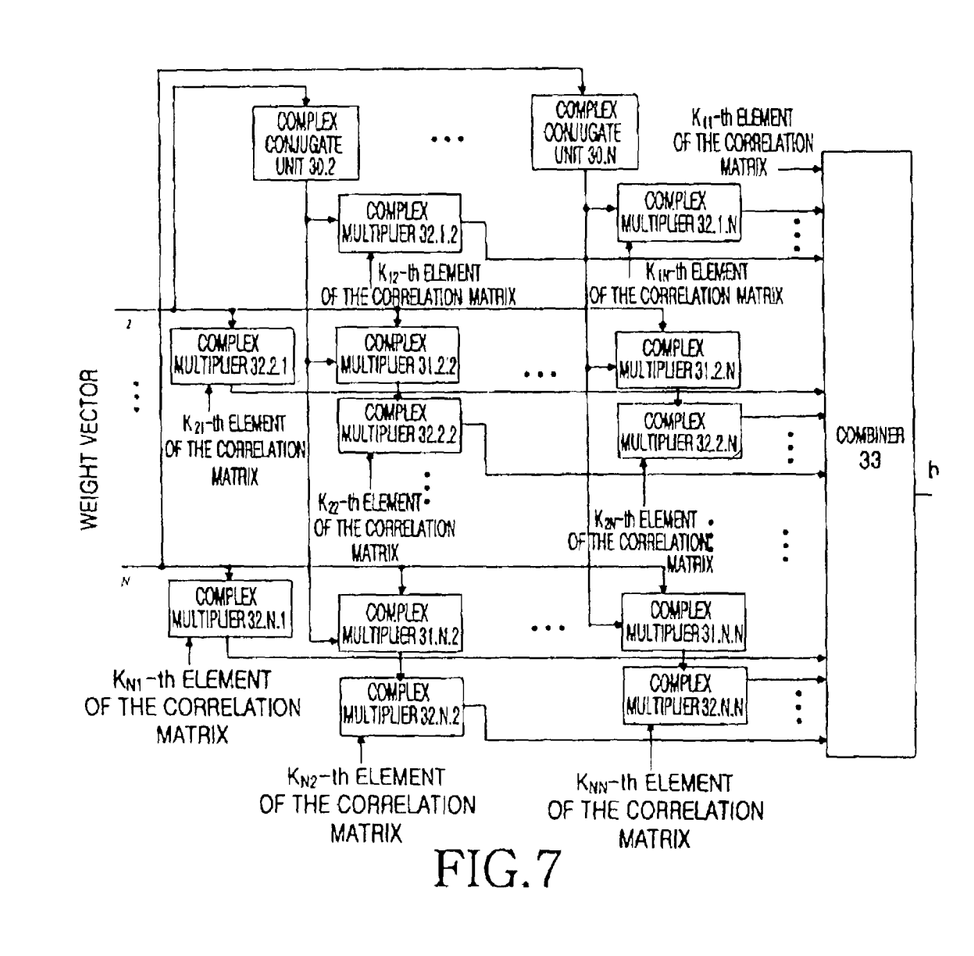
FIG. 7 is an exemplary embodiment of a power calculation unit according to the present invention.

FIG. 7 shows an exemplary embodiment of power calculator 19 of FIG. 4.

The weight vector is sent to the inputs of (N−1) complex conjugate units 30 and to the first inputs of complex multipliers 31 and 32, respectively. Thus, for example, the n-th weight factor is applied to the first inputs of complex multipliers 31.n.2–31.n.N and 32.n.1. From the outputs of (N−1) complex conjugate units the adjoint weight factors 2–N are supplied to the second inputs of complex multipliers 31 and 32. Thus, for example, the adjoint m-th weight factor is sent from complex conjugate unit 30.m to the second inputs of complex multipliers 31.2.m–31.N.m and 32.1.m.

The output signals of all complex multipliers 31 are applied to the first inputs of corresponding complex multipliers 32. To the second inputs of complex multipliers 32 the elements of the corrected correlation matrix are supplied. To the second input of complex multiplier 32.n.m the $\tilde{K}_{nm}$-the element of the corrected correlation matrix is sent.

The output signals of all complex multipliers 32 are delivered to the inputs of combiner 33. The $\tilde{K}_{11}$-th element of the corrected correlation matrix is applied to the first input of combiner 33. The output signal of combiner 33 is the power of the received signal and artificial AWGN at the antenna array output, which is the output signal of power calculator 19.

Searcher 6 in the device of FIG. 3 is standard one and can be implemented, for example, as shown in the book "Search and Synchronization of Wideband Systems" by V. I. Zhuravlev, Moscow, Radio and Communications, 1986, p.24.

Controller 7 with the functionalities and connections described in the application is typical and can be implemented using today's DSP chips, for example, TMS 320Cxx, Motorola 56xxx, Intel, etc.

Figure 8:
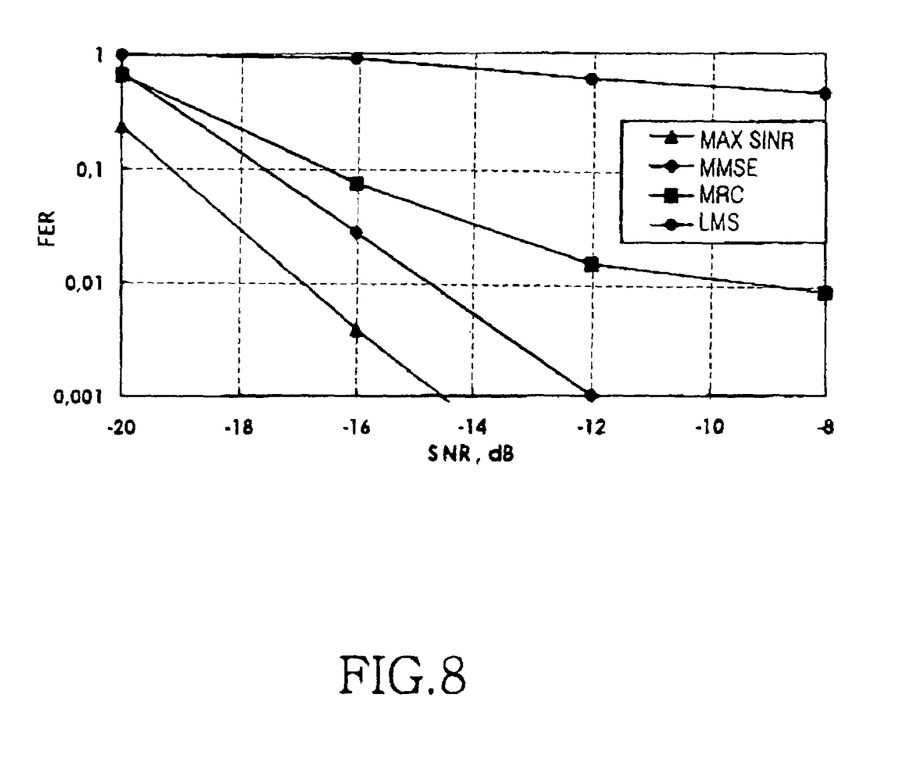
FIG. 8 is a graph of error rate per data frame versus the power ratio of one chip of info channel to the noise power spectrum density.

Computer simulation has shown that the proposed method of antenna pattern forming provides effective mitigation of interference and improvement of accuracy during signal reception in various interference-signal conditions. The MAX 3INR portion of FIG. 8 shows the dependence of frame error rate on the power energy of one info channel chip to the spectrum noise power density during reception of the 3GPP2 signal without interference as a high speed user signal placed at the angular distance of 35° from the desired signal source when processed in accordance with the invention. For comparison, FIG. 8 presents FER curves of other state-of-the-art methods. It is seen that the gain of the proposed method can be of significant values.

What is claimed is:

1. A method of antenna array pattern forming in a multipath signal receiving environment in which a weight vector is formed for every path for which purpose the input signal is periodically demodulated at antenna array elements, a current value of the weight vector, being directly linked to an antenna array pattern, is determined by the steps of:
   a) prior to demodulation of a received signal, determining time positions of path signals;
   b) generating elements of a correlation matrix of the received signal at the antenna array elements by averaging possible pairproducts of the received signals at the antenna array elements within a sliding window interval;
   c) correcting a correlation matrix of the received signal at the antenna array elements and incrementing leading diagonal elements, thereby introducing artificial white Gaussian noise at an output of the antenna array elements;
   d) determining for each path, weight vectors for which it is necessary to determine decision function values;
   e) upon demodulation of the input signal, generating pilot signal complex correlation responses of the antenna array elements;
   f) forming the pilot signal complex correlation response at the output of the antenna array elements for each weight vector by summing products of the pilot signal complex correlation responses of the antenna array elements and the weight vectors corresponding to these elements;

g) determining the power of the pilot signal complex correlation response at the output of the antenna array elements by summing squared inphase and quadrature phase components of the pilot signal complex correlation response at the output of the antenna array elements;

h) determining artificial noise at the output of the antenna array elements by forming a quadrature form of the weight vector generated by the corrected correlation matrix of the received signal at the antenna array elements;

i) generating a decision function value by determining a power ratio of the pilot signal complex correlation response at the output of the antenna array elements to the power of the received signal and the artificial white Gaussian noise at the output of the antenna array elements;

j) determining a current weight vector value as a vector corresponding to a maximum decision function value.

2. The method of claim 1 wherein the weight vectors for which the decision function is calculated are determined using a simplex Nelder-Mead method.

3. The method of claim 2 wherein a simplex size is selected to be constant ant is selected adaptively depending on a path signal fading frequency; the path signal fading frequency being estimated using the pilot signal complex correlation responses at the antenna array output, wherein the higher fading frequency is, the greater the simplex size.

4. The method of claim 1 wherein a simplex size is selected to be constant or it is selected adaptively depending on a pat signal fading frequency; the path signal fading frequency being estimated using the pilot signal complex correlation responses at the antenna array output, wherein the higher fading frequency is, the greater the simplex size.

5. A device of antenna array pattern forming in multipath signal receiving environment, comprising:

L path signal processing units, each comprised of:
  a reference signal generator;
  N complex multipliers; and
  a weight vector former;
  wherein the signal inputs of the N complex multipliers being a first signal input of each of the L path signal processing units, reference inputs of the N complex multipliers being linked to an output of the reference signal generator, an output of the weight vector former being an output of a current weight vector from a corresponding path signal processing unit and corresponding to an output of the device, the device further comprising:

a searcher;
a correlation matrix generator; and
a correlation matrix corrector, each of the L signal processing units further comprising:
  a controller; and
  N pilot signal correlation response generators, the N pilot signal correlation response generators each comprised of:
    a combiner with a reset feature;
    a tapped delay line; and
    a combiner,
  wherein the combiner, the tapped delay and the combiner are all linked successively, the output of each of the N complex multipliers, which includes a demodulated signal, being connected to a first input of a corresponding combiner with the reset feature, a second input of the combiner with the reset feature being the input of the reset signal and connected to a control output of the controller providing synchronous operation of the L path signal processing units, the output of the combiner is the output of the pilot signal correlation response generator and is input as a pilot signal complex correlation response to the weight vector former, wherein N signal inputs of the L path signal processing units are combined and connected to N signal inputs of the correlation matrix generator, the output of which are the values of the elements of the correlation matrix of the received signal at the antenna array elements and is connected to the input of the correlation matrix corrector, the output of which is input to the weight vector former of each of the L path signal processing units as corrected elements of the correlation matrix of the received signal; and wherein, the first signal input of the device is also connected to the searcher, the output of which is the result of a search function and is input to the controller, the searcher input being connected to a corresponding output of the controller.

* * * * *